Feb. 16, 1932.     J. L. SPENCE, JR     1,845,526
COLLAPSING FILM HOLDING SPOOL FOR MOVING PICTURES
Filed Sept. 18, 1929
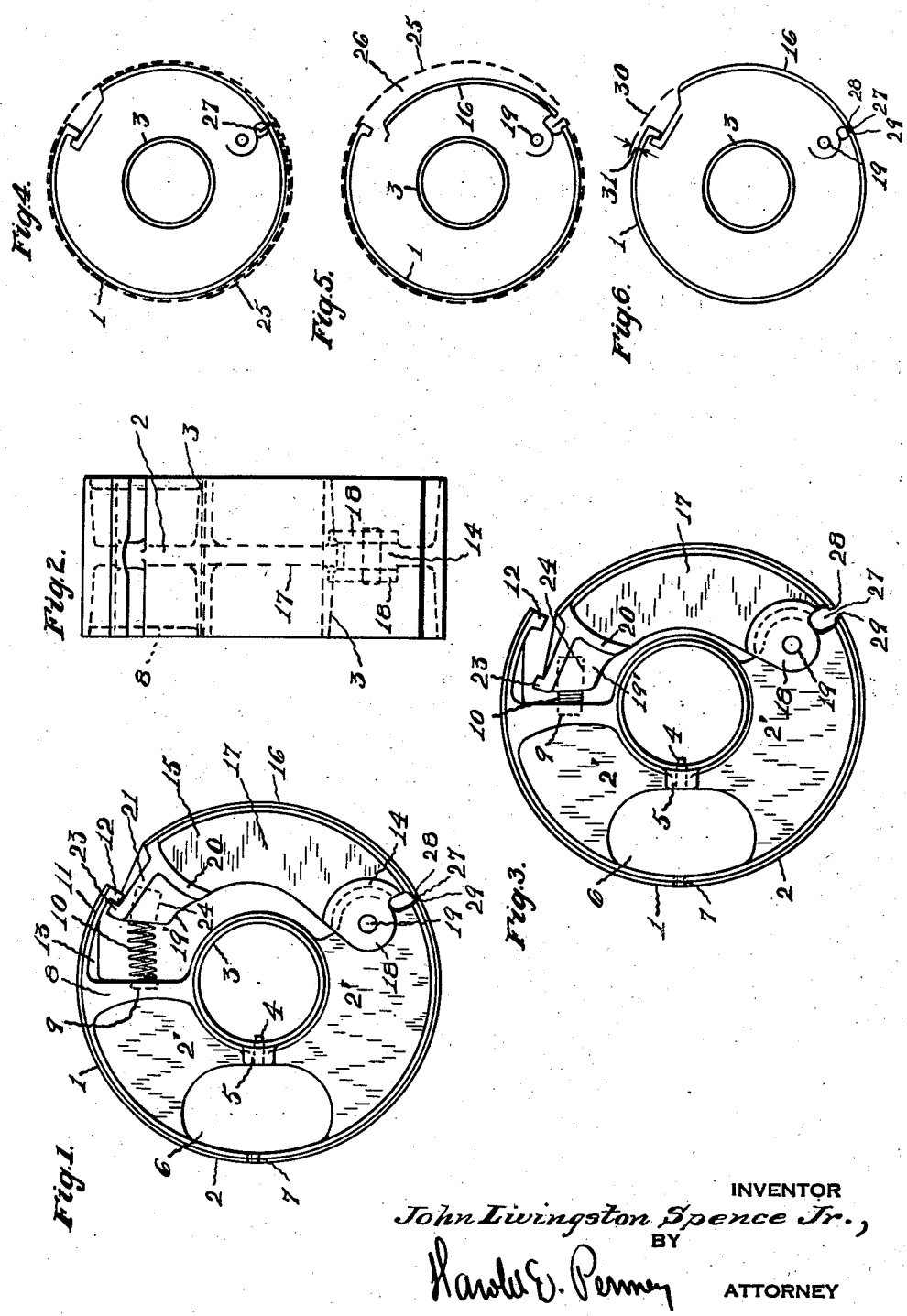
INVENTOR
John Livingston Spence Jr.,
BY
Harold E. Penney   ATTORNEY Patented Feb. 16, 1932

1,845,526

UNITED STATES PATENT OFFICE

JOHN LIVINGSTON SPENCE, JR., OF NEW YORK, N. Y., ASSIGNOR TO AKELEY CAMERA, INC., OF NEW YORK, N. Y., A CORPORATION OF NEW YORK

COLLAPSING FILM HOLDING SPOOL FOR MOVING PICTURES

Application filed September 18, 1929. Serial No. 393,470.

My present invention relates to a collapsing film spool such as is used in moving picture machines for carrying and taking up the film as it is wound or unwound in such machines.

An important advantage of the present device is the provision of means for permitting the collapsing of the take-up spool when it has received its full winding of film, thereby to effect instant removal of the rolled film.

Another object is to provide a positive film-end gripping means whereby upon starting the film upon the spool the film may be positively gripped by pressure actuated film end gripping means thereby to insure positive gripping of the film when the film is first introduced for winding thereon.

A further object is the provision of the film gripping means, above noted, in such a manner that collapsing of the spool, to be more specifically hereinafter outlined, releases said film gripping means automatically with the collapsing of the spool for the removal of the rolled up film therefrom.

Further advantages relate to the manner in which the collapsing portion of the spool is pivoted within the circumferential surface thereof, insuring ease of operation, and freedom from mechanical failure.

These and other capabilities will be ascertained as the herein description proceeds, and it is obvious that modifications may be made in the herein invention without departing from the spirit thereof or the scope of the appended claims.

In the accompanying drawings:

Fig. 1 is a side view of my device in normal film holding uncollapsed position.

Fig. 2 is an elevation thereof.

Fig. 3 is a view similar to Fig. 1, showing the collapsing means on the spool in collapsed position for permitting removal of the wound-up film therefrom.

Figs. 4, 5 and 6 represent a series of diagrammatic views to outline, in the proceeding description, the action in detail of the spool during the normal film winding holding positions and illustrating the action thereof when collapsed for removal, and also indicating slight modifications of dimension to be hereinafter described in detail.

In the constructional details and in Fig. 1, the spool 1 comprises an annular member, the exterior periphery of which is denoted by 2 and which is provided with an internally and centrally located web 2' therein, which web in turn has at its center portion a hub 3 into which said web is merged, said hub having a bored aperture therein for receiving the driving shaft of a moving picture camera machine or projector, and being provided with a small boss 5 at one side thereof, into which is located a key pin 4 which projects into the keyway of a drive shaft, not shown.

For the purpose of drilling a hole to mount the key 4, the web 2' is provided with an opening 6, leaving the peripheral rim portion 2 at that point unsupported, and through which unsupported rim portion an aperture 7 is drilled in order to permit a drill to be passed through into the hub 5 to drill the hole for mounting the key pin 4 therein. Obviously, the hub and key may be mounted in any other desired manner.

The web portion 2, at one part thereof, is provided with a wide, transverse, thickened flange or web 8 into the central portion of which is located a counterbored seat 9 which forms the seating means for a coil spring 10. From the thickened web 8 extends the peripheral portion 11 which has located across its front edge a latching ledge 12, the extending portion 11 being supported and strengthened by a short web 13 which runs from the thickened web 8 to near the outer end of the extending portion 11, thus supporting and reinforcing the extending portion 11. The peripheral portion 2—11 terminates at the ledge portion 12.

On the opposite side from the flange 8 the web portion 2' terminates in an extended or thickened lug portion 14 which is machined on both sides to form a flat bearing upon which is pivotally mounted the collapsing spool section 15.

Structurally, this collapsing spool section, or segment, 15 has at one end thereof an outer curvilinear surface 16 which, when the segment 15 is in operative position as shown in Fig. 1, practically completes the periphery 2 of the spool. The rim or surface 16 is supported by a centrally located web section 17, at the lower end of which are located oppositely spaced lugs 18, the inner surfaces of which are machined to provide practically a yoke to fit over and embrace the expanded lug 14 and within which lugs 18 and 14 is disposed a pivot pin 19.

At the opposite end of said collapsing section 15 is located a boss 19' which terminates at its rear with a cross web 20 thus merging the boss and web integrally with the web section 17. There is also provided upon the boss 19 a web 21 which terminates in an upstanding latch lug 23 which coacts with the previously described latching ledge 12, thereby to hold the pivotally mounted member 15 in such a position relative to the remainder of the spool, or drum, 1, that there is formed, normally, a substantially complete drum upon which the film is rolled. This is fully shown in Fig. 1. In this position, as clearly shown in Figs. 1 and 2, the rim portions 2 and 16 form practically a wide complete film receiving rim, which extends beyond the faces of the web 2', and which rim is concentric with the inner hub 3. The axes of the hub and rim are, of course, parallel and of the same extent.

To hold the member 15 in outer normally uncollapsed position, the spring 10 is, on its opposite end to that previously described, seated in a recess seat 24, located in the boss 19.

As thus assembled the operator may grasp the webs 8 and 20 with his fingers and compress the member 15 towards the member 1, thus collapsing the member 15, as shown in Fig. 3; thus, as indicated in Fig. 5, in which the rolled film center is indicated by the dotted line 25, releasing the rolled up film, at its center, of all holding pressure to the extent of the clearance indicated by 26, Fig. 5, permitting the rolled film to be readily removed from the collapsed spool.

The members 1 and 15 are provided, near the pivot point 19 and at the junction point 27, with extended lips 28, 29, Figs. 1 and 3, which, when the spool is in normal film holding position, practically touch each other, but when the spool is collapsed, as in Fig. 3, the lips 28, 29 are separated. These lips therefore form film-end jaw engaging means so that when starting to wind a film upon the spool it is first collapsed, as in Fig. 3, the film end being introduced at point 27 between the open jaws 28, 29, the member 15 then released to close under the influence of the spring 10, and thereby grip the film end at 27, Fig. 4, permitting the film to be firmly gripped and wound as at 25, Fig. 4, shown dotted.

When the member 15 is collapsed in order to release the film roll for removal, the jaws 28, 29 automatically release their grip on the film end at 27 as shown in Fig. 5.

In some instances in order to insure quick release of the film roll from the collapsed spool, the radius of curvature of the outer rim surface 16 of the hinged segment 15, Fig. 6, may be of slightly greater than the radius of curvature of the surface of member 1. This is shown in Fig. 6, by the dotted line 30, with an exaggerated clearance 31 which is shown in order to better illustrate this feature.

Having thus described my invention, what I claim is:

1. A film winding drum comprising a main body having a wide film receiving rim portion, the body being provided with a hub adapted to receive a shaft, a segment provided with a similar film receiving rim portion, means for hinging the segment and body near adjacent rim edges thereof, resilient means for maintaining the segment rim portion in circumferential alignment with the body rim portion, catch means provided on the adjacent rim edges of the segment and body, opposite the hinged rim edges, to positively maintain said circumferential alignment of said rim portions, the hinged adjacent rim edges of the body and segment being adapted to receive between them the free end of a film to be wound on the drum when said resilient means is in collapsed position.

2. A film winding drum comprising a main body having a wide film-receiving rim portion, the body being provided with a hub adapted to receive a shaft, a segment provided with a similar film receiving rim portion, means for hinging the segment and body near adjacent rim edges thereof, resilient means for maintaining the segment rim portion in circumferential alignment with the body rim portion, catch means provided on the adjacent rim edges of the segment and body, opposite the hinged rim edges, to positively maintain said circumferential alignment of said rim portions, the hinged adjacent rim edges of the body and segment being adapted to receive between them the free end of a film to be wound on the drum when said resilient means is in collapsed position, said hinged adjacent rim edges being in contact with each other, and positively gripping said free film end, when said resilient means is in expanded position.

3. A film winding drum comprising a main body having a wide film receiving rim portion, the body being provided with a hub adapted to receive a shaft, a segment provided with a similar film receiving rim portion, means for hinging the segment and body near adjacent rim edges thereof, resilient means for maintaining the segment rim portion in circumferential alignment with the body rim portion, catch means provided on the adjacent rim edges of the segment and body, opposite the hinged rim edges, to positively maintain said circumferential alignment of said rim portions, the hinged adjacent rim edges of the body and segment being adapted to receive between them the free end of a film to be wound on the drum when said resilient means is in collapsed position, and means on said segment, adjacent the catch thereon, whereby said segment may be collapsed and a roll of wound film removed.

4. A film winding drum comprising a main body having a wide film receiving rim portion, the body being provided with a hub adapted to receive a shaft, a segment provided with a similar film receiving rim portion, means for hinging the segment and body near adjacent rim edges thereof, resilient means for maintaining the segment rim portion in circumferential alignment with the body rim portion, catch means provided on the adjacent rim edges of the segment and body, opposite the hinged rim edges, to positively maintain said circumferential alignment of said rim portions, the hinged adjacent rim edges of the body and segment being adapted to receive between them the free end of a film to be wound on the drum when said resilient means is in collapsed position, said resilient means being disposed between the segment and said body to normally maintain said catches in contact.

5. A film winding drum comprising a main body having a wide film receiving rim portion, the body being provided with a hub adapted to receive a shaft, a segment provided with a similar film receiving rim portion, means for hinging the segment and body near adjacent rim edges thereof, resilient means for maintaining the segment rim portion in circumferential alignment with the body rim portion, catch means provided on the adjacent rim edges of the segment and body, opposite the hinged rim edges, to positively maintain said circumferential alignment of said rim portions, the hinged adjacent rim edges of the body and segment being adapted to receive between them the free end of a film to be wound on the drum when said resilient means is in collapsed position, said hinging means being disposed between said hub and said adjacent film gripping rim edges.

6. A film winding drum comprising a main body having a wide film receiving rim portion, the body being provided with a hub adapted to receive a shaft, a segment provided with a similar film receiving rim portion, means for hinging the segment and body near adjacent rim edges thereof, resilient means for maintaining the segment rim portion in circumferential alignment with the body rim portion, catch means provided on the adjacent rim edges of the segment and body, opposite the hinged rim edges, to positively maintain said circumferential alignment of said rim portions, the hinged adjacent rim edges of the body and segment being adapted to receive between them the free end of a film to be wound on the drum when said resilient means is in collapsed position, said hinged adjacent rim edges being in contact with each other, and positively gripping said free film end, when said resilient means is in expanded position, and means on said segment, adjacent the catch thereon, whereby said segment may be collapsed and a roll of wound film removed.

7. A film winding drum comprising a main body having a wide film receiving rim portion, the body being provided with a hub adapted to receive a shaft, a segment provided with a similar film receiving rim portion, means for hinging the segment and body near adjacent rim edges thereof, resilient means for maintaining the segment rim portion in circumferential alignment with the body rim portion, catch means provided on the adjacent rim edges of the segment and body, opposite the hinged rim edges, to positively maintain said circumferential alignment of said rim portions, the hinged adjacent rim edges of the body and segment being adapted to receive between them the free end of a film to be wound on the drum when said resilient means is in collapsed position, said hinged adjacent rim edges being in contact with each other, and positively gripping said free film end, when said resilient means is in expanded position, and means on said segment, adjacent the catch thereon, whereby said segment may be collapsed and a roll of wound film removed, said resilient means being disposed between the segment and said body to normally maintain said catches in contact.

Signed at New York, in the county of New York and State of New York, this 9th day of September, A. D. 1929.

JOHN LIVINGSTON SPENCE, Jr.